US009450959B2

(12) United States Patent
Sudit et al.

(10) Patent No.: US 9,450,959 B2
(45) Date of Patent: Sep. 20, 2016

(54) METHOD AND SYSTEM FOR UTILIZING A LOCATION-BASED INTERNETWORK GATEWAY

(75) Inventors: Isaias Sudit, Delray Beach, FL (US); Jerome Longbottom, Coral Springs, FL (US)

(73) Assignee: LOC-AID TECHNOLOGIES, INC., Carlsbad, CA (US)

( * ) Notice: Subject to any disclaimer, the term of this patent is extended or adjusted under 35 U.S.C. 154(b) by 741 days.

(21) Appl. No.: 11/394,681

(22) Filed: Mar. 31, 2006

(65) Prior Publication Data

US 2006/0258370 A1    Nov. 16, 2006

Related U.S. Application Data

(60) Provisional application No. 60/670,935, filed on Apr. 13, 2005.

(51) Int. Cl.
| | | |
|---|---|---|
| H04W 24/00 | (2009.01) | |
| H04L 29/06 | (2006.01) | |
| H04W 4/02 | (2009.01) | |
| H04W 8/16 | (2009.01) | |
| H04W 12/08 | (2009.01) | |

(52) U.S. Cl.
CPC ............... *H04L 63/10* (2013.01); *H04W 4/02* (2013.01); *H04W 8/16* (2013.01); *H04W 12/08* (2013.01)

(58) Field of Classification Search
CPC ........ H04L 63/10; H04W 4/02; H04W 8/16; H04W 12/08
USPC ............................................ 455/456.1, 456.2
See application file for complete search history.

(56) References Cited

U.S. PATENT DOCUMENTS

| | | | |
|---|---|---|---|
| 6,295,292 B1 | 9/2001 | Voit et al. | |
| 6,768,994 B1 | 7/2004 | Howard et al. | |
| 6,798,771 B1 | 9/2004 | Low et al. | |
| 7,272,393 B1 * | 9/2007 | Wuthnow et al. | 455/432.1 |
| 2004/0023667 A1 * | 2/2004 | Hines et al. | 455/456.1 |
| 2005/0014513 A1 * | 1/2005 | Mattila et al. | 455/456.1 |
| 2005/0066044 A1 | 3/2005 | Chaskar et al. | |
| 2006/0223518 A1 * | 10/2006 | Haney | 455/420 |

OTHER PUBLICATIONS

International Search Report and Written Opinion of the International Searching Authority for International Application No. PCT/US06/012538.

* cited by examiner

*Primary Examiner* — Marcos Batista
(74) *Attorney, Agent, or Firm* — Lewis Roca Rothgerber Christie LLP

(57) ABSTRACT

A system for utilizing a location-based application across a plurality of networks. A target mobile device operates within a target network of the plurality of networks. A requesting device operates within a requesting network of the plurality of networks. The requesting device transmits a location request for a location of the target mobile device utilizing a location-based service application. A gateway operatively communicates with the requesting network and target network. The gateway receives the location request and determines the target network and communication and location technologies utilized by the target network and transmits the request to the target network utilizing the communication location technology for extraction of the location information. The gateway extracts the location information of the target mobile device and transmits the location of the target mobile device to the requesting device for use with the location-based service application.

18 Claims, 5 Drawing Sheets

METHOD AND SYSTEM FOR UTILIZING A LOCATION-BASED INTERNETWORK GATEWAY

CROSS-REFERENCE TO RELATED APPLICATIONS

This Application is a Non-Provisional claiming priority under 35 USC 119(e)) from U.S. Application No. 60/670,935 entitled CELLULAR TELEPHONE NETWORK LOCATION REQUESTING GATEWAY filed on Apr. 13, 2005.

BACKGROUND OF THE INVENTION

This invention is directed to a methodology and system for enablement of location-based applications for mobile devices such as cellular phones, and more particularly, a system, which allows use of location-based applications without regard to different carriers, wireless standards and protocols.

With the advent of highly developed mobile devices such as cellular phones, and personal digital assistants, it has not only become possible to track the location of these devices, but it has become possible to enable these devices to perform location-based applications. This has resulted in a burgeoning industry for developers to develop location-based applications such as games, tracking, "where is?" and the like.

However, each country, even each service carrier, develops its own protocols for using services. Carriers may even use a plurality of location-based platforms or technologies within a network, i.e., sub networks within networks; a network being an environment, which is homogeneous with respect to location determination and communication technologies. Furthermore, as a result of the proprietary nature of carrier networks, one carrier cannot easily allow another carrier to provide location-based service on its network, i.e., the protocols and technologies are generally cross incompatible. By way of example, as location-based services (LBS) that use assisted global positioning system (AGPS) have become downloadable to a mobile phone, users are limited to their mobile carrier's network and geographical presence or even within use of AGPS technologies. Therefore, users will not be able to use such services across multiple carriers, geographical regions, or other location technologies such as CELL-ID. For example, mobile phone user #1, using carrier A cannot use a LBS application to request a location for mobile phone user #2, using carrier B. This restriction also applies if mobile phone user #1, using carrier A, located in country Z tries to request a location for mobile phone user #2, using carrier A, located in country Y. As a result of the ability to create universal applications, product acceptances as well as growth are hindered.

Accordingly, a method and apparatus, which overcome the shortcomings of the prior art, are desired.

BRIEF SUMMARY OF THE INVENTION

A system for utilizing a mobile device's location across a plurality of networks is provided. A target mobile device operates within a target network of the plurality of networks. A requesting device operates within a requesting network of the plurality of networks. The requesting device transmits a location request for a location of the target mobile device utilizing a location-based service application. A gateway operatively communicates with the requesting network and target network. The gateway receives the location request and determines the target network and communication technology utilized by the target network and transmits the request to the target network utilizing the communication technology for extraction of the location information by the target network. The gateway receives the location response of the target mobile device and transmits the location of the target mobile device to the requesting device for use within the location-based service application.

BRIEF DESCRIPTION OF THE DRAWINGS

Other objects, features and advantages of the present invention will be apparent from the written description and the drawings in which.

DETAILED DESCRIPTION OF THE INVENTION

Figure 1:
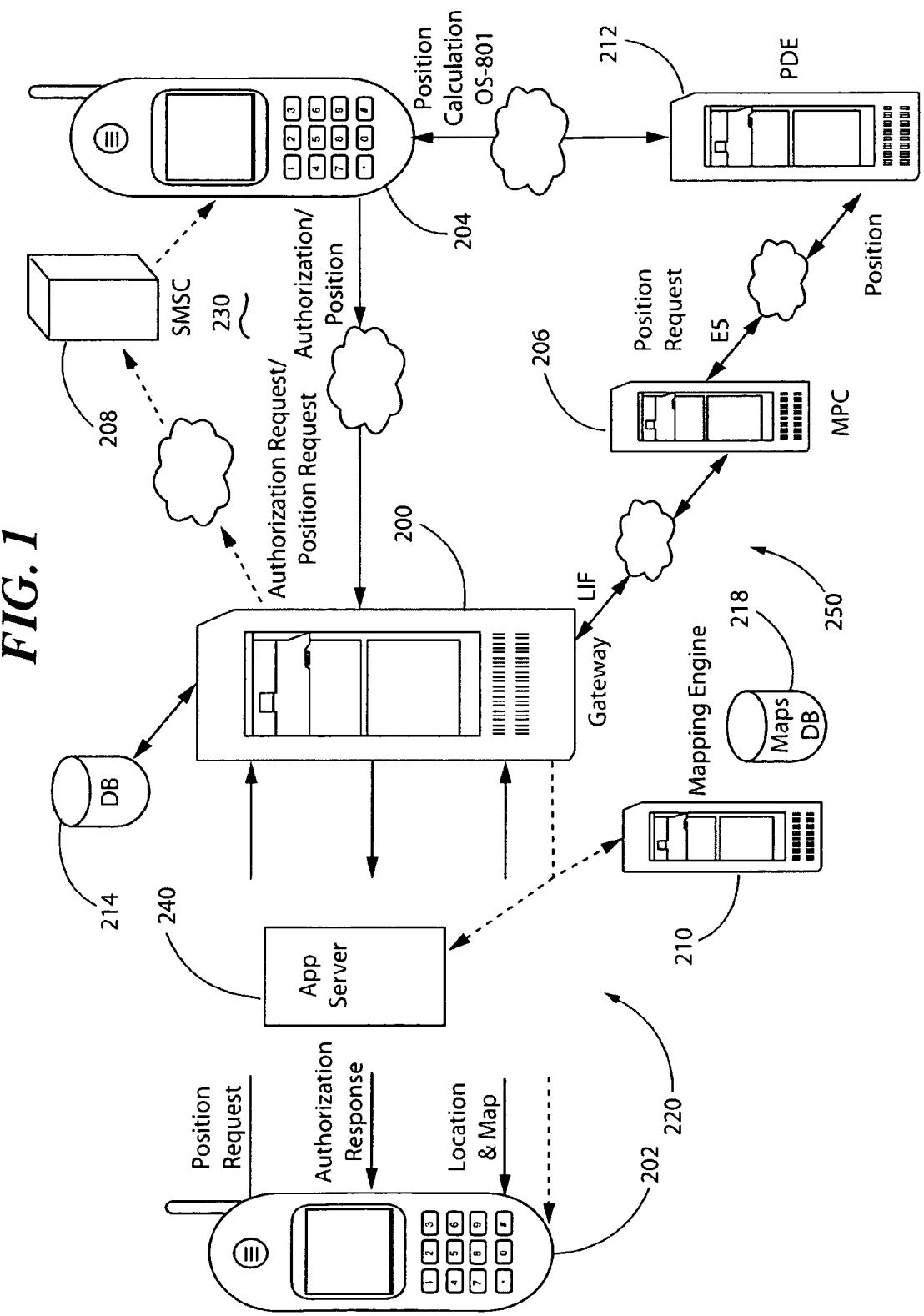
FIG. 1 is an operational flow diagram of a gateway constructed in accordance with the invention within one exemplary type of network.

Generally, as seen in FIG. 1, to facilitate inter-network LBS communications within the framework of a wireless telecommunications network, a gateway 200 is provided at the hub between a requesting communication network 220 and a target communication network 230. Gateway 200 includes functionality for processing received location requests and forwarding the received location requests and responses between its connections to the independent networks 230, 220. A requesting mobile device 202 operates within the requesting network 220. Each location request handled by gateway 200 includes a destination identifier, or information, such as a target address, which can be used to derive the delivery destination, as well as the network over which the location request is to be transmitted, and the location technology utilized, in order to reach an identified target device 204.

In an exemplary embodiment of the invention, a cellular phone network is described. The location request gateway functionality facilitates inter-network communications among and between cellular networks or a wide or local area networks by first determining the target carrier network 230, among a plurality of potential target networks, utilized by a target phone 204, and passing the location request in a format and/or protocol which can be used by the target network. In one exemplary, but non-limiting example, the target address used is the target phone number, or ten-digit mobile identification number is used to determine the target network.

The present invention addresses, at a minimum, the current inter-network location request communication limitations presented by the IS-41 and IS-136 specifications for cellular telephone networks, by way of example, by including a functionality in the location request gateway of the cellular telecommunications network that facilitates inter-network location request communications. With respect to a location request originated by a requesting device, here mobile phone 202, the functionality of the location request gateway 200 analyzes the received request to identify both target network 230 and associated positioning technologies, preferably using the target phone number. The received location request is reformatted (as necessary) by gateway 200 for transmission to the designated network, and forwarded in the proper format to the identified target address via the designated network; allowing target network 230 to utilize its preexisting communication technologies, application technologies and location technologies to process the request for the location of target mobile phone 204.

Similarly, a location request originated on a network other than the cellular network, such as satellite, web-based 802.x-protocol networks or the like, the location request gateway analyzes the received request to identify a target mobile network for delivery. The received location request is then analyzed, the network is identified, the appropriate technologies are determined, and a request is made by the gateway to the target network, and forwarded to the location responding device, either the mobile device or network location infrastructure, via the target network.

In order for the location request gateway 200 to identify the target network 230 and location of target phone 204 for delivery, a destination identifier (target phone number, mobile identification number, automatic vehicle location ("AVL") ID or the like) is incorporated in the location request. The destination identifier includes both a network designation (identifying the network over which the received location request is to be transmitted) and a destination address (identifying the addressee on the designated network to which the received location request is to be delivered).

Similarly, a location request originated by the requesting device and intended for e-mail delivery to a certain user will include a destination identifier for determining a network designation of the user's local area network ("LAN") or wide area network ("WAN") and a destination address of the user's network address on the LAN or WAN. For requests originated outside the cellular network, such as a Web request, and intended for delivery to a cellular subscriber, the request will include a destination identifier for determining a network designation of the subscriber's cellular network and a destination identifier of the subscriber's mobile station telephone number on the cellular network. A phone number or mobile identification number is readily adapted to provide this function.

More specifically, a communication system 250 has a first network 220, a second network 230 and a gateway 200 as its hub. A requesting device, here phone 202, for ease of example, is in a first country A and communicates across requesting carrier network 220.

Network 220 includes a location-based application-based server 240 for enabling and processing location-based applications. As seen in FIG. 1, location-requesting device 202 makes the request of the application server 240, which in turn makes the request of gateway 200. In the cellular phone embodiment, the cellular phone may work utilizing TCP/IP protocols as known in the art. In limited cases, mobile device 202 may make the request directly to gateway 200.

LBS applications use or generate dynamic (position dependent) content. As is known in the art, both longitude and latitude and street address maps are used in connection with LBS applications. Accordingly, application server 240 may communicate with a mapping engine 210 and its associated map database 218. It is understood in the art that mapping engine 210 and database 218 may be remotely located from application server 240 or be at the same physical location.

Target device 204, in our example a mobile cellular phone 204, is functionally part of target network 230. It should be understood that a target device 204 may in fact be "located" in several networks simultaneously. It may be in one network for text messaging, one network for voice data, a third network for one LBS application and a fourth network for a second type of LBS application. Each of these networks may include their own system architecture, system protocols and/or system communication technologies and system location technologies. Target device 204 may interact with gateway 200 in one of two ways for processing location-based applications; direct query of the target mobile device or query through the network location determination infrastructure.

In a first processing mode, network 230 includes a short message service center (SMSC) 208 in which the mobile phone 204 is capable of processing location-based applications. Phone 204 communicates directly with gateway 200 utilizing messages with a location response through SMSC 208 or TCP/IP protocols.

In a second mode, gateway 200 communicates with the target network location determination architecture. In a non limiting example gateway 200 is in communication with a mobile positioning center ("MPC") 206 within network 230. In turn, MC 206 communicates with a position determining entity ("PDE") server 212. However, PDE 212 and MPC 206 may be replaced by any other position determining architecture or LBS application server, such as a general mobile locating center or the like, as a function of the communication technologies 300 (FIG. 3) or location technology 310 utilized by target network 230.

Dependent upon the communication technology and location technology utilized, all or part of network 230 may be utilized. For example, if target mobile device utilizes an AGPS/CDMA target network 230, then interaction with PDE 212 and optionally MPC 206 will be required. Similarly, as will be discussed below, when location is determined independent of communication with target device 204, MPC 206 may still need to be consulted.

It is understood, that although a single requesting network 220 is involved in each situation, the communication system at which gateway 200 finds itself the hub, includes a plurality of potential target networks, of which only target network 220 is shown for ease of description. Furthermore, as discussed above, each network may differ by at least one of the communication technology utilized (TDMA v. CDMA), the location technology used (AGPS v. CELL-ID; which may change as a function of the application, target device as well as the network), or the application technology for the location-based service (BREW v. JAVA or SMS; which also may change as a function of not only the network but the target device or target application). Therefore, as seen in FIG. 3, gateway 200 is the interconnection of the application development technology 330 such as WEB, WAP, SMS, JAVA and BREW by way of non-limiting example; communication technologies 300 for the mobile wireless devices such as CDMA, GSM, TDMA, IDEN, and 802.x-protocol by way of non-limiting example, and location technologies 310 such as AGPS, CELL-ID, WLS, E-OTD and ETDOA.

For ease of example and simplicity, in the example below it is assumed, by way of non-limiting example, that a cellular phone utilizing AGPS location technologies is utilized. By way of simplified example, gateway 200 bridges two carrier networks (220, 230). It may bridge more.

Figure 3:
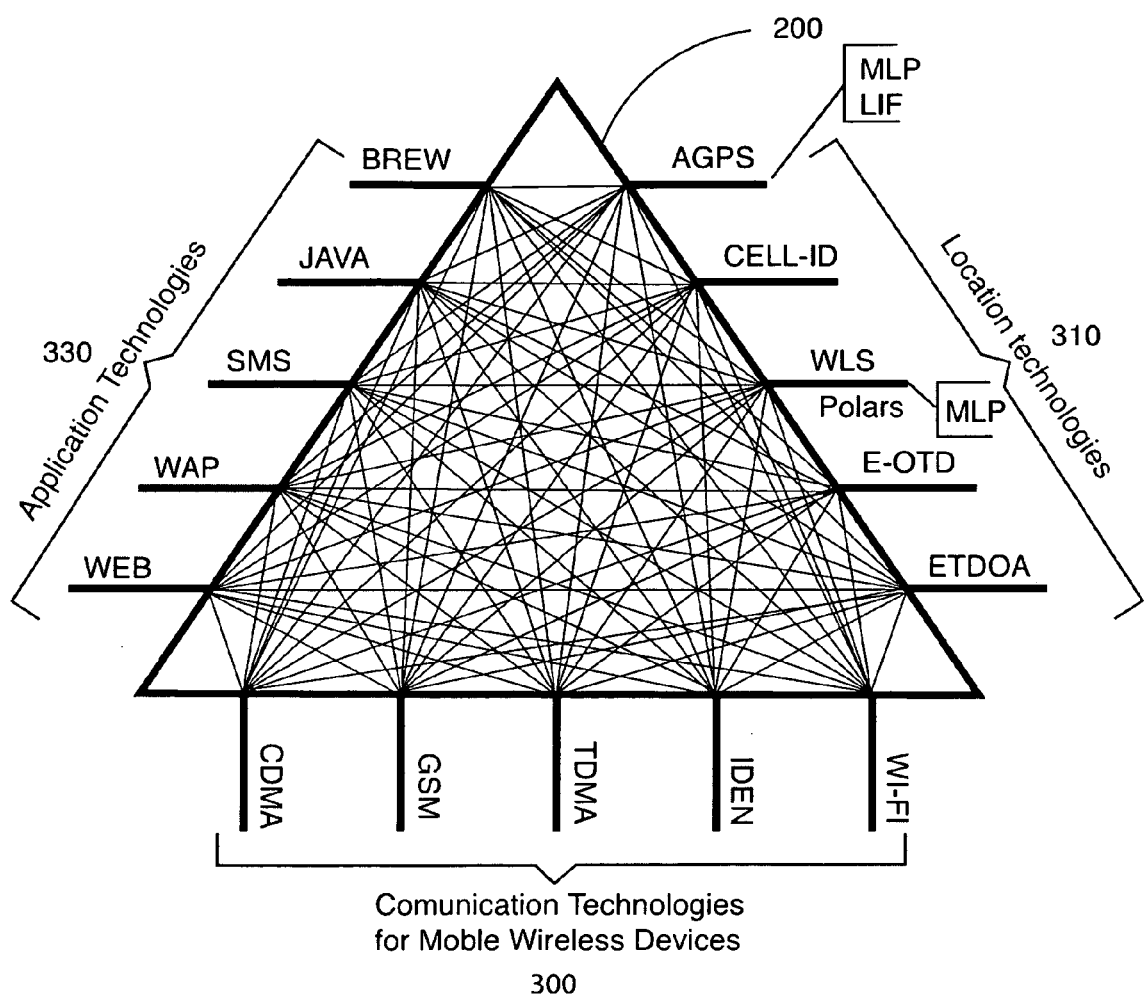
FIG. 3 is a schematic diagram of the operation of the gateway in accordance with the invention.

In order to facilitate cross-network utilization of LBS applications, gateway 200, as best shown in FIG. 3, must utilize, enable and identify the appropriate protocol and/or technology to be utilized both by target network and requesting network 220. Therefore, gateway 200 must understand the communication technology of requesting network 220 as well as the location technology 310 utilized within network 220 and, with certain applications, may be capable of utilizing the application technologies 330 of the application server 240 located in requesting network 220. Similarly, in order to make the request across the disparate networks to target network 230, gateway 200 must be able to identify and utilize the communication technology 300 utilized by network 230. Otherwise, it would not be able to gain access to target network 230. Gateway 200 must also make use of and therefore be able to identify the appropriate location technology 310 utilized by network 230 and, in some instances, know and use the application technology 330 utilized by the specific target device 204.

In a preferred embodiment, a database 214 is provided which maps the destination identifier (the telephone number in the simplest example) to the target network and its associated communication technology. Knowing the network, application or target device, as a function of the destination identifier, the location technology may be stored and mapped to the destination identifier in database 214. Lastly, knowing the target device, target application and application technology 330 may be associated with the identification number, stored and mapped in database 214. Therefore, gateway 200, utilizing the destination identifier, may look up the associated communication technology, location technology or application technology to determine the appropriate target network and make use of these technologies for extracting a location response as discussed in greater detail below.

In its most simplified form, a requesting device, whether mobile or stationary, such as web- or home-based, makes an LBS request of a target mobile device, whether a mobile personal digital assistant ("PDA"), AVL or cell phone as in this particular example. This request is made to an application server, which enables an LBS application. The server, in turn, makes a request to the gateway requesting the target device location. The gateway, by parsing information from the request, determines the network, communication technology for the target network and the location technology for the target network. The gateway then sends the request utilizing the network's communication technology and location technology through the network associated with the target phone based upon this information.

Figure 2:
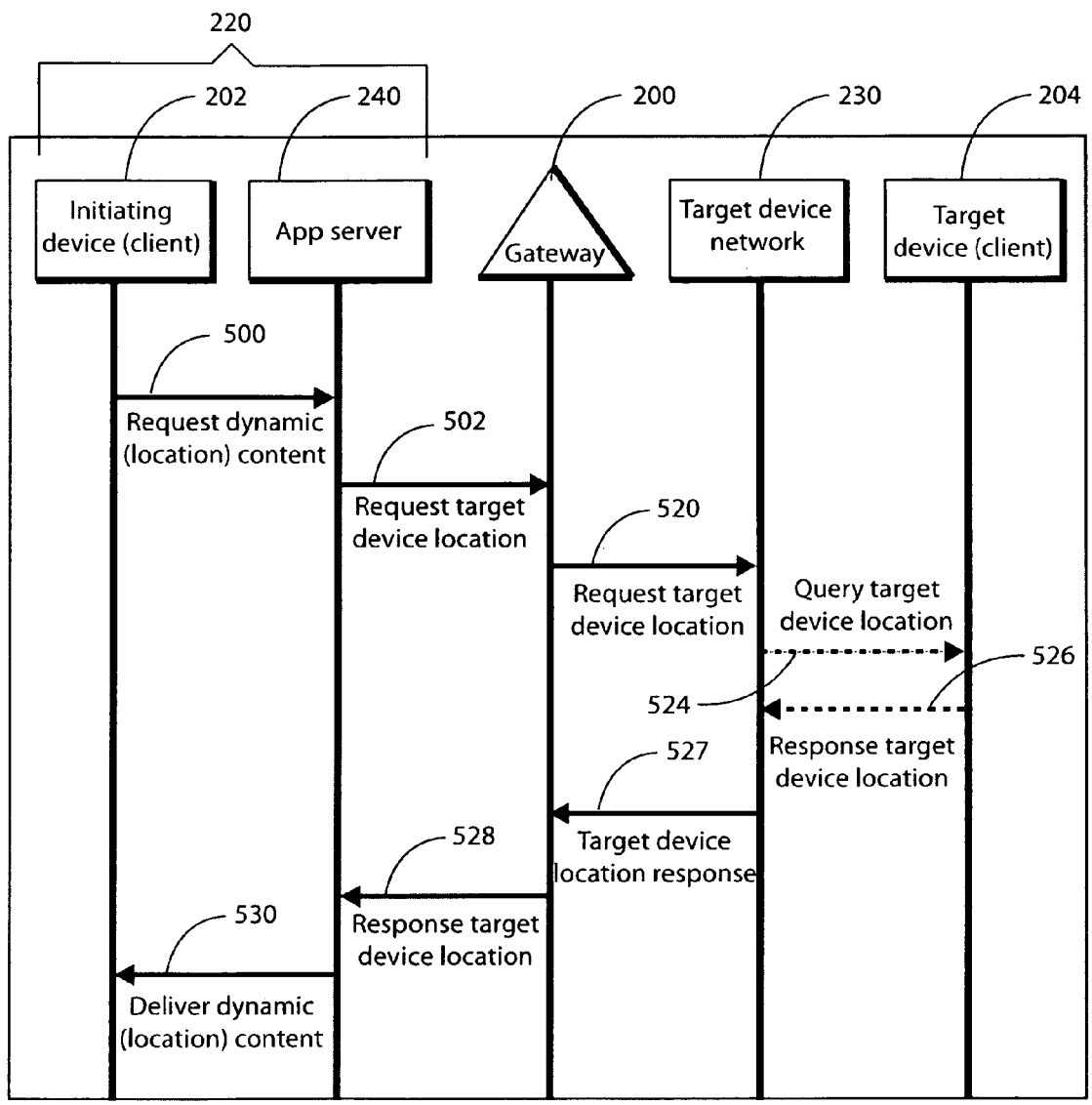
FIG. 2 is an operational flow diagram of the operation of a gateway in accordance with the invention.

Reference is now made to FIG. 2 in which an operational diagram for utilizing gateway 200 across networks 220, 230 is shown.

In a step 500, mobile phone 202 tries to locate target phone 204 by issuing a request to locate target phone 204 to perform a desired LBS application. Requesting phone 202 attempts to locate target phone 204. A request may be made directly to gateway 200 if no application server is required and gateway 200 will enable extraction of the necessary information. However, in this example, the request to determine the position of target phone 204 is made to LBS application server 240.

In a step 502, application server 240, at a minimum, passes on the request to gateway 200. In a step 520, gateway 200 makes a location request to target network 230. As part of step 520, gateway 200 parses out information from the request, which includes an identifier of the target mobile device and makes a request for the target device location in a step 520 to target device network 230 as a function of identifying the network based on the identifier. As part of step 520, gateway 200 utilizes the lookup table in database 214 to determine the network identity, communication technology and location technology for the identified target network, and, as needed, the application technology. The location request is passed on to target network 230 in step 520 to extract a location response in one of at least two non-limiting ways.

In one embodiment, this may be done by a text message utilizing SMSC 208 as part of target network 230. In this embodiment, SMSC 208 merely passes on a request to target phone 204 to return its location as a location response.

In the preferred embodiment, gateway 200 determines the appropriate carrier as a function of the phone number or other indicia associated with the request as discussed above. Gateway 200 sends a request to the appropriate carrier's position determination infrastructure within network 230, which provides service to target phone 204. When utilizing the network-determined position, the location/position gateway 200 may use a Location Interoperability Forum protocol (LIF). Gateway 200 makes the request utilizing the communication and location technologies of target network 230. The network's position determination infrastructure (e.g., MPC 206) passes the request to the carrier's position determining entity using an E5 or E5' protocol, by way of example. The target mobile's position is then determined via IS-801 over TCP/IP between the PDE 212 and the target device 204. In effect, MPC 206 presses a request for "I need to find."

Target device 204 responds to the query in a step 526 identifying its location to network 220 utilizing the protocols of target device 204 and network protocols and structures of target network 230. In one embodiment, it responds to gateway 200 through the network utilizing SMSC 208. In step 526, the location response may alternatively be returned by the location infrastructure, for example PDE 212, which in turn returns the location response to the MPC 206 and thus to gateway 200. In this way, target device network 230 reports the target device location, in a step 527, to gateway 200. Gateway 200 provides the target device location to the application server 240 of network 220 utilizing the protocols and network architecture preexisting in network 220. It is understood that gateway 200, utilizing its lookup tables, or predetermined information, forwards the location information to requesting network 220 utilizing the communication technology 300 and/or location technology 310 of target network 230.

In another embodiment, gateway 200 may query the position determination infrastructure of the target network such as an MPC, PDE, gateway mobile location center (GMLC) or equivalent structure in target network 230.

Application server 240 receives the location response from the gateway 200 in a step 528. Server 530 applies the application to the location response and delivers the dynamic location content to requesting phone 202 in a step 530. In other words, application server 240 enables the use of the location by requesting phone 202.

It should be understood that it is shown in a simplified example that database 214 is associated with gateway 200. However, it is well within the contemplation of the invention that database 214 may be a third party data source located at its own network addressable and accessible by gateway 200 across its own network.

Figure 4:
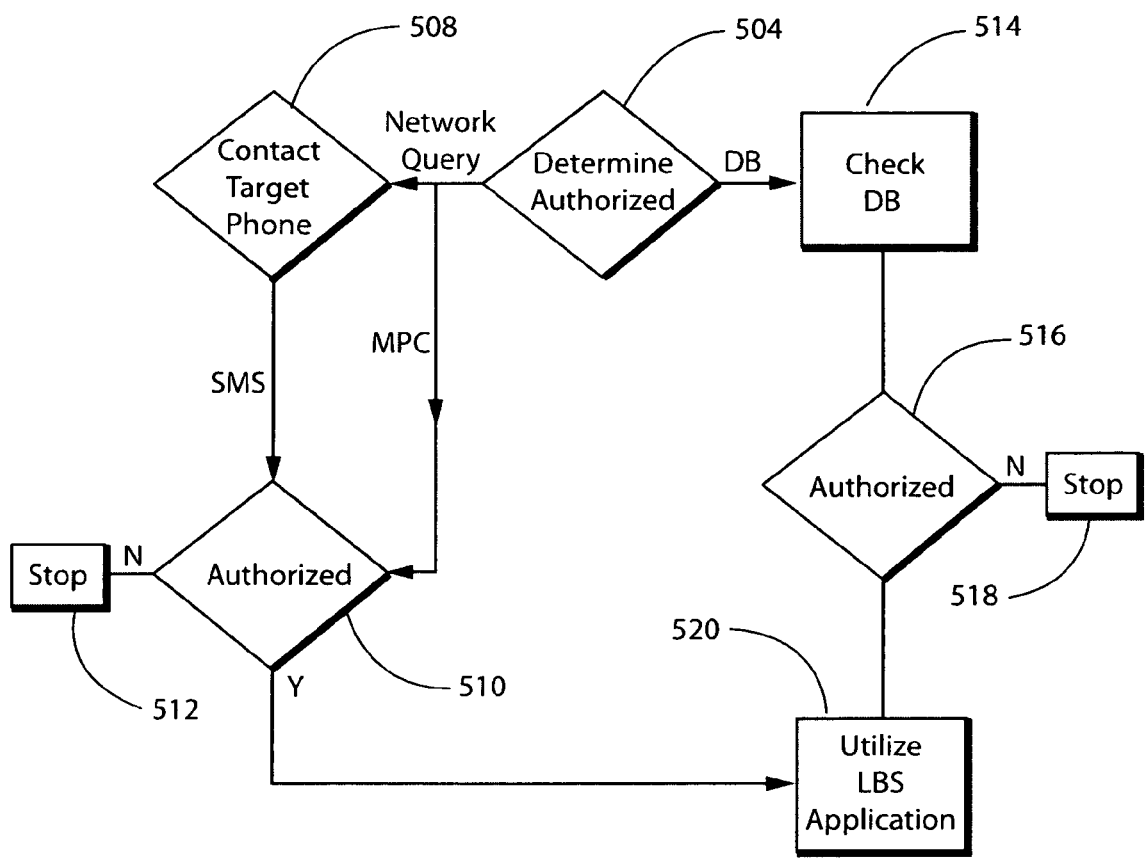
FIG. 4 is a flow chart for providing privacy in accordance with the invention.

In an alternative embodiment, it may be beneficial to provide target device 204 or target network 230 with the ability to authorize the use of an LBS application for target device 204 in a step 504. Reference is now made to FIG. 4 in which an authorization protocol for one embodiment of the invention is provided. If database 214 is used in step 514, the database may include a map of all requesting devices 202 authorized to request the location of target device 204. Database 214 is scanned to determine whether or not authorization occurs in a step 516. If it is determined in step 516 that authorization should not be provided, then the process is stopped in step 518 and a location response will be sent from gateway 200 to requesting application server 240, utilizing, for example, TCP/IP or short message protocols to indicate that the location is unavailable to requesting phone 202. However, if authorization is provided, then, as discussed above, gateway 200 will pass the request to target device 204 in step 520.

Alternatively to a locally maintained database (associated with the gateway 200), the target device's authorization information may be provided via a query by gateway 200 to an authoritative source.

If, on the other hand, authorization is determined by requesting permission from target phone 204 or network 230 in step 504, the request may be processed by first determining the location of the target phone 204 as discussed above. To facilitate discussion, it is assumed that mobile phone 202 and mobile phone 204 are subscribers to two different carriers utilizing different networks and at least one of different location technologies 310 and communication technologies 300. Therefore, gateway 200 must first determine the proper way to locate target phone 202 in step 508.

Once target phone 204 is located, then in accordance with a first method, gateway 200 stimulates a text message addressed to target network 230 and target phone 204 inquiring as to whether or not target phone 204 wishes to be located. If the user of target phone 204 signals acceptance, authorization is granted in a step 510 and requesting phone 202 is enabled to utilize LBS applications in steps 520-530. If authorization is denied then the process stops in a step 512 and a message is sent to requesting phone 202 that the phone is unavailable.

In another embodiment, in order to provide authorization in step 510, target mobile phone 204 stores its personal approval list. When target phone 204 receives the request, it compares it to the list to determine whether a match occurs. If no match occurs, target phone 204 is then provided with the ability to allow the user to accept or decline the request and will proceed accordingly as discussed above. If the request is accepted, a position calculation according to the IS-801 or other appropriate standard is performed and returned to gateway 200, either directly through a TCP/IP protocol or utilizing the PDE and MPC.

The authorization response is preferably in the form of a SMS message generated by gateway 200 and returned to requesting phone 204 utilizing MSSC 208.

It should be understood that in particular in the embodiment where authorization is provided utilizing a lookup table in database 214 that if no corresponding authorized identification number exists in the lookup table, then access to the target network will be denied. Similarly, if there is no corresponding network associated with the identification number received with the request to gateway 200, access to the network will de facto be denied as there is no corresponding method for determining the communication language with target network 230. Furthermore, where there is no corresponding network information or authorization permission, then gateway 200 provides a location response; the content of the location response being either an unavailable message or access denied type of message.

The gateway was described at the exchange between two mobile devices; phones. However, it is within the scope of the invention for the requesting device to be a stationary device, such as a personal computer (PC), locating one or more mobile devices for use with a location-based service application. Furthermore, the mobile device may be a PDA, AVL or the like, and the network may be cellular, 802.x-protocol based, satellite or any other network capable of locating and communicating with a mobile device.

Figure 5:
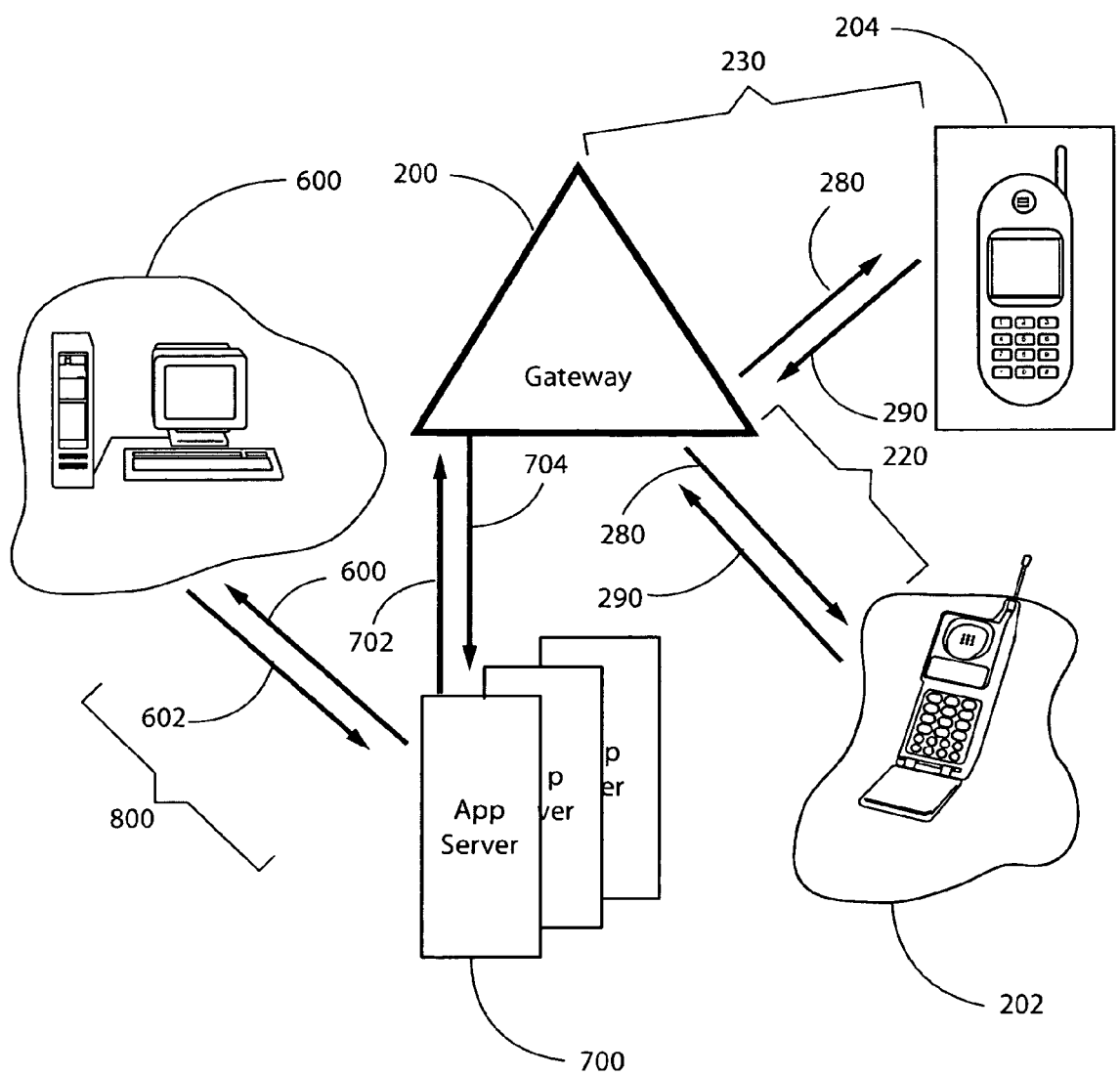
FIG. 5 is a schematic diagram showing the use of location-based services across two or more networks in accordance with the invention.

Reference is now made to FIG. 5 in which a system for providing the location of one or more mobile devices utilizing a web or other stationary application is provided. Like numerals are utilized to indicate like structures. A PC 600 communicates with one or more location-based application servers 700 across a network 800. Gateway 200 is in communication with target phone 204 across network 230 and target phone 202 across network 220 as discussed above. The structures of networks 220 and 230 are the same as discussed above; however, in this example, both are target mobile networks. Network 800 may be a landline network or any type of wireless communication network.

PC 600 interacting with a web-based application desires to view the locations of target mobile devices 202, 204. PC 600 generates a request for location 602 transmitted to the application server 700 for processing the desired request. As above, the request includes the target address (phone numbers for mobile phones, AVL address for AVLs, or the like) and any information required by the application server for enabling the application, which is known to the stationary requesting device (in this non-limiting example, a personal computer). Application server 700 may perform some validation of the request and forward a request 702 to gateway 200. The request sent to gateway 200, at a minimum, includes the identity of the target devices 202, 204 but may also include identification of the application server 700, identification of the requesting device 600 or even a transaction identifier for logging or billing purposes.

As discussed above, gateway 200 will identify the network and the location technologies 310 and the communication technologies 300 for target identified network and device. As discussed above, gateway 200 extracts the location of the devices from the respective networks by providing the request 280 to the appropriate target network utilizing the appropriate technologies. Gateway 200 receives location response 290 from the target network. These are the location queries and responses respectively discussed above. Gateway 200 may correspond directly with target phones 202, 204 or operate through a network as discussed above.

Once the location results have been reported to gateway 200, gateway 200 returns the request to the appropriate requesting application server 700 by providing a location information response 704. Application server 700 performs any necessary application functions to generate the appropriate and accurate content utilizing the received location and transmitting the location content 604 to requesting device 600.

Thus, while there have been shown, described and pointed out novel features of the present invention as applied to preferred embodiments thereof, it will be understood that various omissions and substitutions and change in the form and detail are contemplated the disclosed invention may be made by those skilled in the art without departing from the spirit and scope of the invention. It is the intention therefore to be limited only as indicated by the scope of the claims appended hereto. It is also to be understood that the following claims are intended to cover all of the generic and specific features of the invention herein described and all statements of the scope of the invention which, as a matter of the language, might be said to fall therebetween.

What is claimed as new and desired to be protected by Letters Patent of the United States is:

1. A system for utilizing a location-based application across a plurality of networks comprising:
   a target mobile device operating within a target network of said plurality of networks, wherein the target network has a first communication technology, a first location technology and a first application technology;
   a requesting device operating within a requesting network of said plurality of networks wherein the requesting network has a second communication technology, a second location technology and a second application technology, the requesting device transmitting a location request for a location of said target mobile device utilizing a location-based service application having a third application technology executed on a location-based services application server; and
   a gateway operatively communicating with said requesting network and target network using the first and second communication technologies, said gateway receiving the location request via the second communication technology, and the second application technology, and determining the target network and the first communication technology, the first location technology and the first application technology utilized by said target network; reformatting the request to said first communication technology, the first location technology and the first application technology, and transmitting the request to said target network utilizing said first communication technology, first application technology and first location technology for extraction of a location response by said target network using said first location technology, receiving the location response of the target mobile device via the first communication technology, the first location technology and the first application technology, reformatting the location of the target mobile device to the third application technology to be utilized by the location-based service application and transmitting the location of the target mobile device to the requesting device for use with the location-based service application.

2. The system of claim 1, wherein the location-based services application server is disposed within said requesting network, the location request being transmitted to the location-based services application server, the location-based services application server transmitting at least the location request to the gateway, and the gateway sending the location response to the location-based services application server for use with the location-based services application.

3. The system of claim 1, further comprising a database, the gateway communicating with the database, said database including a lookup table, the gateway utilizing the lookup table for determining the target network, the first communication technology, the first location technology and the first application technology utilized by said target network.

4. The system of claim 3, wherein said gateway utilizes said lookup table for determining at least one of the communication technology and location technology utilized by the target network.

5. The system of claim 1, wherein the target device determines whether said location request is authorized, and at least one of said gateway and said target network refusing to provide location information in response to said request.

6. The system of claim 1, wherein said gateway creates a text message transmitted to said target network for extracting the location response from said target network.

7. The system of claim 1, wherein said target network includes location determining infrastructures, said gateway communicating with the location determining infrastructure to extract the location response.

8. The system of claim 1, wherein said gateway stores request authorizations and determines whether said location request is authorized, and preventing such request where said request is unauthorized.

9. The system of claim 1, further comprising a second target mobile device operating within a second target network of said plurality of networks, said gateway communicating with said target network and determining a second target network and third communication technology and third location technology utilized by said second target network in response to said location request, transmitting the location request to said second target network utilizing said third communication technology and third location technology for extraction of a second location response by said second target network, receiving the second location response of the second target mobile device and reformatting and transmitting the location of the second target mobile device to the requesting device for use with the location-based service application.

10. A method for utilizing a location-based application across a plurality of networks between a target mobile device operating within a target network of said plurality of networks having a first communication technology, a first location technology and a first application technology, a requesting device operating within a requesting network of said plurality of networks having a second communication technology, a second location technology and a second application technology, the method comprising:
   making a request from a requesting device for a location of said target mobile device using the second communication technology and the second application technology, utilizing a location-based service application having a third application technology that is executed on a location-based services application server;
   receiving the request at a gateway communicating between said requesting network and said target network;
   determining the target network from said plurality of networks and the first communication technology, first location technology and first application technology of the target network;
   reformatting the request to said first communication technology, the first location technology and the first application technology;
   transmitting the request to said target network utilizing said first communication technology, said first location technology and said first application technology for extraction of a location response by said target network;
   receiving said location response via the first communication technology, the first location technology and the first application technology at said gateway;
   reformatting the location response to the third application technology to be utilized by the location-based service application; and
   transmitting the location response to the location-based services application server to be sent to the requesting device for use with the location-based service application.

11. The method of claim 10, wherein said gateway determines the target network, the first communication technology, the first location technology and the first application technology utilized by said target network, from a lookup table.

12. The method of claim 10, further comprising the step of the gateway communicating with a database, said database including a lookup table, the gateway utilizing the lookup table for determining whether the location request is authorized.

13. The method of claim 10, further comprising the step of determining whether the request is authorized by querying the target mobile device; and transmitting an authorization response from said target mobile device to said gateway.

14. The method of claim 11, comprising the step of at least one of said gateway and target network refusing to provide the location response in response to said request when authorization is denied.

15. The method of claim 10, further comprising the step of the gateway communicating with a database, the database containing a lookup table, the gateway querying the lookup table to determine the target network.

16. The method of claim 15, wherein said request includes a destination identifier, the gateway utilizing the destination identifier to query the lookup table for identifying the target network.

17. The method of claim 10, further comprising the step of transmitting the request to said target network utilizing said location technology for extraction by stimulating a short text message to said target network.

18. The method of claim 10, wherein said target network includes location determining infrastructure, and further comprising the step of extracting the location response log querying the location determining infrastructure.

* * * * *

UNITED STATES PATENT AND TRADEMARK OFFICE
CERTIFICATE OF CORRECTION

PATENT NO. : 9,450,959 B2  
APPLICATION NO. : 11/394681  
DATED : September 20, 2016  
INVENTOR(S) : Isaias Sudit et al.

Page 1 of 1

It is certified that error appears in the above-identified patent and that said Letters Patent is hereby corrected as shown below:

In the Claims

Column 10, Line 12,    Delete "said target network",  
Claim 9                Insert --said second target network--

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*